Jan. 5, 1954  J. M. PESTARINI  2,665,403
ELECTRIC MOTOR
Filed Dec. 15, 1950
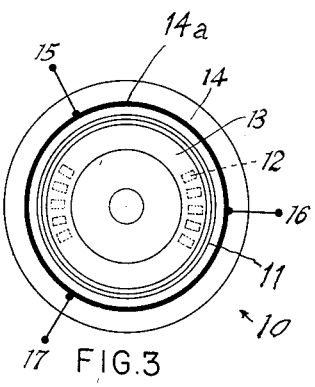
FIG.3
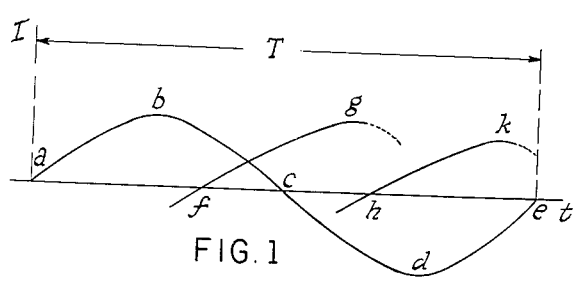
FIG.1
FIG.2
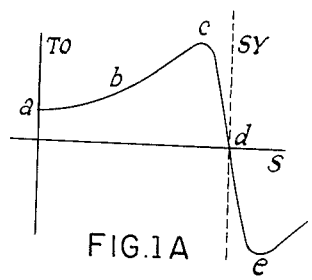
FIG.1A
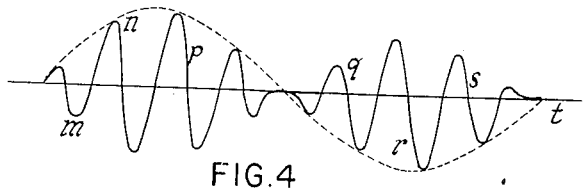
FIG.4
FIG.5
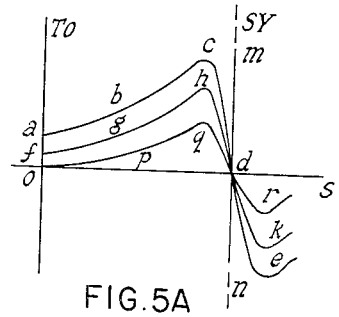
FIG.5A
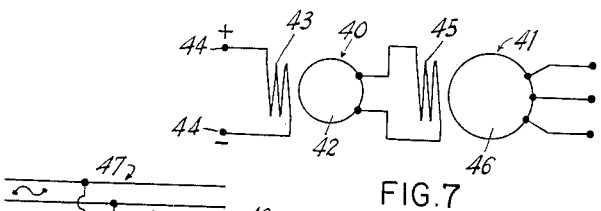
FIG.7
FIG.8
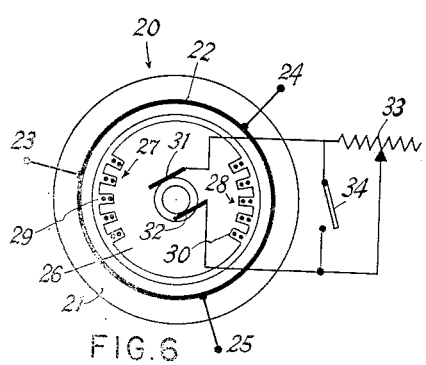
FIG.6
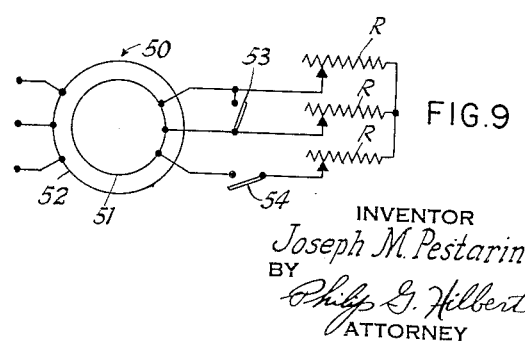
FIG.9
INVENTOR
Joseph M. Pestarini
BY
Philip G. Hilbert
ATTORNEY Patented Jan. 5, 1954

2,665,403

UNITED STATES PATENT OFFICE 2,665,403

ELECTRIC MOTOR

Joseph M. Pestarini, Staten Island, N. Y.

Application December 15, 1950, Serial No. 200,959

8 Claims. (Cl. 318—165)

This invention relates to alternating current motors.

In conventional polyphase induction motors of the squirrel cage or wound rotor type, a torque is developed only when the rotor revolves at a speed other than that of the rotating magnetic field, which is the synchronous speed. The ratio of the difference between the speed of such motor and the synchronous speed thereof, to the synchronous speed, is known as slip. The developed torque of such motors is proportional to the slip and therefore, becomes zero when the slip is zero.

Accordingly, an object of this invention is to provide an improved polyphase alternating current motor of the squirrel cage or wound rotor type which is adapted to develop a torque when the rotor revolves at synchronous speed.

A further object of this invention is to provide a current supply means for said improved motor, which is adapted to generate a system of polyphase currents for energizing said motor in a manner to allow said motor to develop a torque at synchronous speed.

Another object of this invention is to provide an improved polyphase alternating current motor which combines the operational characteristics of synchronous and asynchronous motors.

Other objects of this invention will in part be obvious and in part hereinafter pointed out.

In the drawing:

Fig. 1 is a diagrammatic representation of the currents supplied to a conventional alternating current motor of the squirrel cage or wound rotor type; Fig. 1A is an operational curve for such motors, showing torque-speed relationships;

Fig. 2 is a developed representation of an end ring and conductors of a conventional squirrel cage motor;

Fig. 3 is a side view of a motor embodying the invention; diagrammatic in part;

Fig. 4 is a diagrammatic representation of the currents supplied thereto;

Fig. 5 is a developed representation of an end ring and conductors in the motor shown in Fig. 3; Fig. 5A shows torque speed curves for motors embodying the invention in comparison with that of a conventional motor;

Fig. 6 is a side view of a motor embodying the invention and illustrating a modification thereof; diagrammatic in part;

Fig. 7 is a circuit diagram showing the interconnections of current supply means embodying the invention;

Fig. 8 is a circuit diagram of a modified form of current supply means; and

Fig. 9 is a schematic diagram of a motor embodying the invention and illustrating a further modification thereof.

In Fig. 1 is shown a diagram illustrating the characteristic curves of the alternating currents which are adapted to energize a conventional polyphase motor of the squirrel cage or wound rotor type. The current I is plotted against the time $t$, where T represents the time interval for a complete cycle. The curve $abcde$ represents the current of a single phase. The incomplete curves $fg$; $hk$, represent the currents of second and third phases, respectively.

The curves in Fig. 1 may also represent the instantaneous magnetic induction of a conventional polyphase motor along the air gap thereof; the abcissa T then representing the total development of the air gap of the motor, which is assumed to have 2 poles.

As shown in Fig. 2, which is a developed representation of one of the end rings 1 of a conventional squirrel cage motor, the conductors 2 of the squirrel cage are regularly and equidistantly spaced from one another, and therefore, would be regularly and equiangularly spaced on the rotor of the motor.

The usual torque-speed curve $abcde$ of such a motor, is shown in Fig. 1A, wherein the torque TO increases to a maximum at speed corresponding to point $c$ on the curve, such speed being other than the synchronous speed indicated at SY corresponding to point $d$ on the curve, where the torque drops to zero.

In Fig. 3 is shown a polyphase motor 10 embodying the invention, which may have 2 poles and includes a rotor 11 having the usual core which is formed with slots or the like wherein bars 12 are disposed in two groups spaced from one another. The groups are located at diametrically opposite positions and are interconnected by opposed end rings 13. The bars or conductors 12 are closely spaced with in each group, as indicated in a developed representation of a single end ring 13, shown in Fig. 5.

The motor 10 further includes a stator 14 having a polyphase winding 14a, indicated as three phases for the purpose of illustration, with leads 15, 16 and 17.

The motor 10 is adapted to be energized with a system of polyphase currents having a first fundamental angular frequency and having an amplitude which is periodically variable with a second fundamental angular frequency different from the first fundamental angular frequency.

One of such currents in one phase of stator winding 14a has an instantaneous intensity I₁ which may be expressed as a function of time, as follows:

$$I_1 = A \sin w_1 t \sin w_2 t$$

where A is a constant and $w_1$, $w_2$ are pulsations or angular frequencies of different magnitude.

Fig. 4 is a representation of such a characteristic current curve mnpqrs, wherein $w_1 = 8w_2$. The envelope of such a curve, indicated in dotted lines, is the sinusoidal curve abcde of Fig. 1.

The current of the second phase of the stator winding has an instantaneous intensity I₂, which may be also expressed as follows:

$$I_2 = A \sin w_1 t \sin \left( w_2 t - \frac{2\pi}{3} \right)$$

Such a current may be diagrammatically represented by a curve similar to curve mnpqrs, but having an envelope of the sinusoidal curve fg . . . , of Fig. 1.

Similarly, the current I₃, of the third phase of the stator winding may be expressed:

$$I_3 = A \sin w_1 t \sin \left( w_2 t - \frac{4\pi}{3} \right)$$

and may be represented by a curve similar to curve mnpqrs, but having an envelope of the sinusoidal curve hk . . . , of Fig. 1.

Here, the dotted sinusoidal curve or envelope in Fig. 4, may also represent the instantaneous magnetic induction of the motor 10 along the air gap thereof, the abcissa again representing the total development of the air gap of the motor.

With the motor 10, it has been found that the rotor 11 rotates at the same speed as the rotating field produced by stator 14. When there is no torque, the midpoint of each group of bars or conductors 12 coincides with a radius passing through the zero point of the rotating flux created by the stator winding 14a, as indicated by the relative position of corresponding points on Figs. 4 and 5. Such a position may be expressed as the no load position. It has been found that as soon as the relative angular position of the rotor 11 shows a displacement from said no load position, the torque developed is proportional to such angular displacement.

It is understood that the conductors 12 are closely spaced in each of the groups, such groups being periodic with respect to the periphery of the rotor. The radial axes of symmetry passing through the respective groups of conductors must be equiangularly spaced. The number of groups of conductors is equal to the number of poles on the motor. Furthermore, the said axes are so located so that the Joule effect losses in the conductors 12 become a maximum when the axes of the groups are displaced 90 electrical degrees from the magnetic axes of the poles of the motor. When such displacement is 90 electrical degrees, the torque developed by the motor becomes zero. For a small angular displacement from such position, the torque is proportional to the angular displacement and said torque increases as said losses increase.

The torque-speed characteristic of motor 10 is shown in Fig. 5A, wherein the curve opqr represents the torque developed at speeds other than the synchronous speed SY. When the motor reaches its synchronous speed, the torque is represented by mdn, where the ordinate shows a maximum value of the synchronous torque of the same order as the maximum value of the torque in an asynchronous motor, as shown in Fig. 1A and repeated in curve abcde, in Fig. 5A, for comparative purposes. It will be noted that the maximum torque of motor 10 is somewhat less than the maximum torque developed by a conventional squirrel cage motor. However, upon attaining synchronous speed a strong torque is developed.

The invention may also be embodied in a wound rotor type motor, as shown in Fig. 6. Here, the motor 20 includes a stator 21 having a three phase winding 22 with leads 23, 24 and 25. The motor further includes a rotor 26 which is formed with groups of slots 27, 28, located at diametrically opposite portions thereof. The winding on rotor 26 takes the form of conductors disposed in the slot groups 27, 28 and indicated at 29, 30, respectively.

The conductors 29, 30 are comparable to the groups of conductors 12 in the motor 10. Here also, the conductors are located in spaced groups, equiangularly spaced and equal in number to the number of poles on the motor.

Thus, the conductors 29, 30 represent a monophase winding, the terminals of which are adapted to be connected to slip rings 31, 32, for connection to an external circuit as later described.

It is understood that motors of this invention may develop a torque at speeds other than the synchronous speed, so that the motor may start itself under little or no load, upon initiating the rotation of the rotor. Thus the motor has a strong synchronous torque but a relatively weak asynchronous torque. In order to increase the asynchronous torque at low speeds, a resistance 33 is connected in circuit with the monophase winding through slip rings 31, 32. A switch 34 is provided for short circuiting the slip rings, when the synchronous speed is reached.

Means is provided for supplying the proper polyphase system of currents to the motors embodying the invention. Such means, indicated in Fig. 7, may comprise a rotary electric machine 40 in circuit with a polyphase machine 41. The machine 40 includes a single phase armature winding 42 and a field winding 43 which is excited by direct current from a suitable source, through terminals 44. The machine 41 includes a field winding 45 which is energized by the output of machine 40; and a polyphase armature winding 46. The winding 46, which is three phase for the purpose of illustration, has leads for supplying current to motors 10 or 20, through their respective leads.

The machines 40, 41, having the same number of poles, may be independently rotated at different speeds, thereby providing the currents previously described. It is understood, that the same results may be attained if the machines have a different number of poles and are rotated at the same speed. In either case, the frequency of the output of machine 40 will be greater than the frequency of the current generated by the machine 41 if such machine were excited with conventional direct current.

The machine 40 may be replaced by an alternating current source 47, which has a fundamental angular frequency different from the fundamental angular frequency of a polyphase current produced by machine 41, if machine 41 had its field winding excited with direct current, as shown in Fig. 8.

A motor embodying the invention and having a strong synchronous torque, may be provided as shown in Fig. 9. Here, the motor 50 includes a wound polyphase winding 51 on the rotor thereof, and a polyphase winding 52 on the stator thereof.

The stator winding 52 is adapted to be energized from a polyphase current source such as previously described and shown in Figs. 7, 8. With such a motor a strong asynchronous torque is developed through use of the polyphase winding on the rotor. However, upon reaching synchronous speed, all but one of the phases of the winding is rendered inoperative, thereby leaving the rotor with a monophase winding which functions in the manner previously described in connection with motors 10, 20.

Accordingly, conventional starting resistors R are used to interconnect the terminals of the rotor winding 51 through slip rings, not shown. A switch 53 is connected across the terminals of one phase of the winding, while a switch 54 is connected in series with the terminal of another phase of the winding.

For starting motor 50, switch 53 is opened and switch 54 is closed, the resistances R being at a maximum value. The resistances are gradually reduced as the motor speed increases. When synchronous speed is reached, switch 53 is closed and switch 54 is opened, thereby rendering all phases of winding 51 but one, inoperative.

Referring to Fig. 5A, it will be seen that the motor 50 has a relatively strong asynchronous torque which approaches the maximum asynchronous torque of a conventional squirrel cage motor. Thus the curve *fghk* has a maximum torque at point *h* and in addition has a strong synchronous torque indicated by line *mdn*.

It is understood that motors and current supply means embodying the invention, may have any given even number of poles. In addition, either member of such motor or means may be rotatable while the other member thereof is stationary; or both members may rotate at different speeds.

The system of polyphase currents described above depend on sinusoidal values of different angular frequency. It is understood that currents depending on periodical values having a fundamental sinusoidal value and harmonics of said fundamental sinusoidal value, may also be used.

It will thus be seen that there is provided improved motors, current supply means and combinations thereof in which the several objects of this invention are achieved, and which are well adapted to meet the conditions of practical use.

As various possible embodiments might be made in the above described invention, and as various changes might be made in the embodiments set forth, it is to be understood that all matter herein set forth or shown in the accompanying drawing, is to be interpreted as illustrative and not in a limiting sense.

Having thus described my invention, I claim as new and desire to protect by Letters Patent:

1. In combination, a polyphase alternating current motor comprising a pair of members having relative rotary movement, one of said members including a polyphase winding and the other member including a plurality of successively spaced groups of operative conductors, said groups of conductors being equiangularly displaced from one another and being equal in number to the number of poles of said polyphase winding, and means for supplying said polyphase winding with a system of sequential currents having substantially an intensity equal to the product of a constant, the sine of a first pulsation and the sine of a second pulsation different from the first pulsation, each current differing from a preceding current by an angular lag in one pulsation of said current proportional to the angular displacement of any pair of the successive polyphase windings.

2. The combination as in claim 1, wherein the conductors of said other member form a single phase winding, and an adjustable resistance in circuit with said single phase winding.

3. The combination as in claim 1, wherein said other member includes a pair of oppositely disposed end rings interconnecting said groups of conductors.

4. The combination as in claim 1, wherein said last mentioned means comprises a polyphase machine including a field winding, and means for supplying to said field winding an alternating current having a fundamental angular frequency greater than the fundamental angular frequency of a polyphase current adapted to be produced by said machine with a direct current excitation of the field winding thereof.

5. The combination as in claim 4, wherein said last mentioned means comprises a monophase alternator operating at a speed different from the speed of said polyphase machine.

6. The combination as in claim 4, wherein said polyphase machine includes a polyphase armature winding, and said last mentioned means comprises a monophase alternator in circuit with the field winding of said polyphase machine, the product of the number of pairs of poles of said alternator and the angular speed thereof being different from the product of the number of pairs of poles of said polyphase machine and the angular speed thereof.

7. In combination, a polyphase alternating current motor comprising a pair of relatively rotatable members, each of said members including a polyphase winding, means for supplying one of said windings with a system of sequential currents having substantially an intensity equal to the product of a constant, the sine of a first pulsation and the sine of a second pulsation different from the first pulsation, each current differing from a preceding current by an angular lag in one pulsation of said current proportional to the angular displacement of any pair of the successive polyphase windings, resistance means in circuit with the other of said windings, and means for disconnecting said resistance means and rendering all phases of said last mentioned winding inoperative but one, at a predetermined speed of said motor.

8. The combination as in claim 4, wherein said last mentioned means comprises a monophase alternator having a number of poles different from that of said polyphase machine and operating at the same speed as that of said polyphase machine.

JOSEPH M. PESTARINI.

References Cited in the file of this patent

UNITED STATES PATENTS

| Number | Name | Date |
|---|---|---|
| 621,924 | Knauth | May 28, 1899 |
| 919,302 | Armstrong | Apr. 27, 1909 |
| 2,072,894 | Lilja | Mar. 9, 1937 |
| 2,338,525 | Mason | Jan. 4, 1944 |
| 2,461,566 | Morrill | Feb. 15, 1949 |